United States Patent
Ogawa et al.

(10) Patent No.: US 10,214,436 B2
(45) Date of Patent: Feb. 26, 2019

(54) WASTEWATER TREATMENT DEVICE, BACTERIA BED USED FOR TREATING FOOD WASTE AND WASTEWATER, AND WASTEWATER TREATMENT METHOD USING BACTERIA BED

(71) Applicants: Hiroshi Ogawa, Saitama (JP); Keiichiro Fujimoto, Tokyo (JP)

(72) Inventors: Hiroshi Ogawa, Saitama (JP); Masashi Toyooka, Tokyo (JP)

(73) Assignees: Hiroshi Ogawa (JP); Keiichiro Fujimoto (JP)

( * ) Notice: Subject to any disclaimer, the term of this patent is extended or adjusted under 35 U.S.C. 154(b) by 214 days.

(21) Appl. No.: 14/900,547

(22) PCT Filed: Jun. 25, 2013

(86) PCT No.: PCT/JP2013/067321
§ 371 (c)(1),
(2) Date: Dec. 21, 2015

(87) PCT Pub. No.: WO2014/207814
PCT Pub. Date: Dec. 31, 2014

(65) Prior Publication Data
US 2016/0152499 A1 Jun. 2, 2016

(51) Int. Cl.
*B01D 35/00* (2006.01)
*B01D 35/14* (2006.01)
(Continued)

(52) U.S. Cl.
CPC ............... *C02F 3/102* (2013.01); *C02F 3/04* (2013.01); *C02F 3/105* (2013.01); *C02F 3/109* (2013.01);
(Continued)

(58) Field of Classification Search
CPC ........ C02F 2305/06; C02F 3/08; C02F 3/201; C02F 3/2806
See application file for complete search history.

(56) References Cited

U.S. PATENT DOCUMENTS 4,715,958 A * 12/1987 Fuchs .................. C02F 3/10
210/504
5,480,538 A * 1/1996 McCombs ......... B01D 19/0005
210/151
(Continued)

FOREIGN PATENT DOCUMENTS

JP 8-242856 9/1996 ............. C12N 11/00
JP 2000-37683 2/2000 ............... B09B 3/00
(Continued)

OTHER PUBLICATIONS

JPH08242856 A (machine translation), Mitsusachi et al, Sep. 24, 1996, pp. 1-12.*
(Continued)

Primary Examiner — Ana M Fortuna
(74) Attorney, Agent, or Firm — Hayes Soloway P.C.

(57) ABSTRACT

A wastewater treatment device for decomposing solid matter using aerobic microorganisms in a bacteria bed, includes a decomposition tank that accommodates the solid matter obtained by crushing food waste and the bacteria bed, a water supply capable of supplying water to the decomposition tank, and a stirrer for stirring the solid matter and the bacteria bed in the decomposition tank. The bacteria bed includes a carrier made of a synthetic resin having a plurality of pores and microorganisms carried in the plurality of the pores.

19 Claims, 10 Drawing Sheets

(51) Int. Cl.
  *B01D 21/24* (2006.01)
  *B01D 29/07* (2006.01)
  *C02F 1/44* (2006.01)
  *B01D 24/00* (2006.01)
  *C02F 3/10* (2006.01)
  *C02F 3/04* (2006.01)
  *C02F 3/12* (2006.01)
  *C02F 103/00* (2006.01)

(52) U.S. Cl.
  CPC ...... *C02F 3/1242* (2013.01); *C02F 2103/002* (2013.01); *C02F 2201/002* (2013.01); *Y02W 10/15* (2015.05)

(56) References Cited

U.S. PATENT DOCUMENTS

| | | | | |
|---|---|---|---|---|
| 5,531,897 | A * | 7/1996 | Stormo | C02F 3/06 210/606 |
| 5,618,412 | A * | 4/1997 | Herding | B29C 43/06 210/150 |
| 5,645,725 | A * | 7/1997 | Zitzelsberger | C02F 1/444 210/151 |
| 6,488,854 | B2 * | 12/2002 | O'Leary | C02F 3/006 210/195.3 |
| 6,881,332 | B1 | 4/2005 | Ogawa et al. | 210/202 |
| 6,926,830 | B2 * | 8/2005 | Ho | C02F 3/085 210/150 |
| 9,954,282 | B2 * | 4/2018 | Abe | H01Q 5/55 |
| 2002/0030003 | A1 * | 3/2002 | O'Leary | C02F 3/006 210/151 |

FOREIGN PATENT DOCUMENTS

| | | | |
|---|---|---|---|
| JP | 3436266 | 6/2003 | ............... B09B 3/00 |
| JP | 2003-236512 | 8/2003 | ............... B09B 3/00 |
| JP | 2010-498 | 1/2010 | ............... C02F 11/02 |
| JP | 2013-67715 | 4/2013 | ............... C08G 18/48 |

OTHER PUBLICATIONS

EP-1734010 a1 (abstract), Dec. 20, 2016 Marcus et al.*
International Preliminary Report on Patentability issued in application No. PCT/JP2013/067321, dated Jan. 7, 2016 (14 pgs).
International Search Report and Written Opinion issued in corresponding PCT Patent Appln. No. PCT/JP2013/067321, dated Jul. 16, 2013, with English translation (25 pgs).
International Preliminary Report on Patentability issued in corresponding PCT Patent Appln. No. PCT/JP2013/067321, dated Dec. 29, 2015 (9 pgs).

* cited by examiner

WASTEWATER TREATMENT DEVICE, BACTERIA BED USED FOR TREATING FOOD WASTE AND WASTEWATER, AND WASTEWATER TREATMENT METHOD USING BACTERIA BED

TECHNICAL FIELD

The present invention relates to a wastewater treatment device, a bacteria bed for treating wastewater, and a wastewater treatment method, for effectively treating food waste and domestic wastewater, especially wastewater containing solid matter such as food waste and the like that are crushed by a disposer for disposal, discharged from a collective housing such as a mansion, a hotel, a restaurant, a hospital, a composite building, a food factory and the like.

BACKGROUND ART

There is proposed an aerobic decomposition treatment in which food waste and domestic wastewater, especially wastewater containing solid matter such as food waste and the like that are crushed by a disposer for disposal, discharged from a collective housing such as a mansion, a hotel, a restaurant, a hospital, a composite building, a food factory and the like, are directly sent to a wastewater tank 32 of a solid-liquid separation tank 14 by a pump 6; the solid matter in the wastewater is collected by a solid-liquid separation device 33 installed therein; aerobic microorganisms, a neutralizing agent, a deodorant agent, and the like are added to the collected solid matter 38; and the collected solid matter 38 is changed to inorganic materials, such as carbon dioxide, water, nitrate ions, sulfate ions, and the like, by the aerobic microorganisms, while being stirred and mixed by a stirring device 17 in a decomposition tank 11. Further, in a wastewater treatment device such as this, by sending air bubbles for aeration to a treatment tank (an aeration tank) by using a blower, decomposition treatment by the aerobic microorganisms in the treatment tank is activated (e.g., see Patent Literature 1).

CITATION LIST

Patent Literature

Patent Literature 1: Japanese Patent No. 3436266 (paragraphs from {0038} to {0050})

SUMMARY OF INVENTION

Technical Problem

In the wastewater treatment device shown in Patent Literature 1 above, the solid matter is usually decomposed into water and CO2, while the solid matter is stirred together with a bacteria bed made of chaff containing microorganisms. However, since chaff itself is originated from a plant, the chaff is easily decomposed by the microorganisms when used as a bacteria bed, thereby causing a problem that the chaff constituting the bacteria bed needs to be periodically replenished.

Further, the chaff constituting the bacteria bed not only serves as a nest for the microorganisms, but also plays a role of supplying an air to aerobic microorganisms by facilitating an air flow in a space between the chaff. However, as decomposition and the like of the chaff itself proceed by the aerobic microorganisms, a space between the chaff becomes smaller and air permeability in the wastewater treatment tank becomes poor. As a result, it becomes unable to supply sufficient air to the aerobic microorganisms and propagation of the aerobic microorganisms is reduced, thereby causing a problem of producing foul odors.

Further, in a conventional case where aerobic decomposition is performed while air bubbles for aeration are supplied, penetration of the air bubbles is blocked by sludge contained in wastewater in a treatment tank. As a result, since it becomes unable to supply an air thoroughly to aerobic microorganisms in the treatment tank, the aerobic decomposition cannot be effectively performed, thereby causing a problem of requiring time to decompose solid matter such as sludge.

The present invention has been made in view of such problems and an object, thereof is to provide a wastewater treatment device capable of securing sufficient air permeability inside of a wastewater treatment tank, sufficiently propagating aerobic microorganisms over an extended time, and preventing production of foul odors.

Solution to Problem

The wastewater treatment device of the present invention is a device for performing a decomposition treatment of solid matter by using aerobic microorganisms in a bacteria bed, characterized by comprising a decomposition tank, for accommodating the solid matter obtained by crushing food waste and the bacteria bed, a water supply means capable of supplying water to the decomposition tank, and a stirring means for stirring the solid matter and the bacteria bed in the decomposition tank, wherein the bacteria bed comprises a carrier made of a synthetic resin having a plurality of pores and microorganisms carried in the plurality of pores.

According to this aspect, the bacteria bed, is constituted of a synthetic resin, thus decomposition by the microorganisms does not occur and it becomes possible to stably ensure the bacteria bed, and eventually the plurality of the pores carrying the microorganisms. As a result, the aerobic microorganisms not only survive in the pores over an extended time, but also are sufficiently propagated inside thereof, thereby eliminating foul odors. Further, since the aerobic microorganisms are carried inside of the pores, the aerobic microorganisms are prevented from leaking out by an impact or water invasion caused by stirring.

The wastewater treatment device of the present invention is characterized in that a prescribed amount of an enzyme is carried inside of the plurality of the pores.

According to this aspect, by the action of the enzyme carried inside of the pores of the bacteria bed, it becomes possible not only to increase a propagation rate of the aerobic microorganisms, but also to sufficiently propagate the aerobic microorganisms.

The wastewater treatment device of the present invention is characterized in that at least a surface part of the bacteria bed is constituted of an elastic body having a strong shape restoring force.

According to this aspect, at least the surface part of the bacteria bed is constituted of an elastic body having a strong shape restoring force, thus, in a stirring process where the solid matter and the bacteria bed are stirred in the treatment tank, at least the surface part of the bacteria bed undergoes deformation of compression and restoration repeatedly by collision and contact between the bacteria beds to facilitate absorption/discharge of water and air in/out of the pores of the bacteria bed. As a result, it becomes possible to sufficiently supply the water and the air required for propagation of the aerobic microorganisms into the pores of the bacteria bed.

The wastewater treatment device of the present invention is characterized in that the bacteria bed is constituted of a urethane sponge.

According to this aspect, the urethane sponge has almost equal specific gravities to that of the solid matter obtained by crushing food waste after absorbing wastewater, thus the bacteria bed and the solid matter are not separated from each other during stirring and decomposition of the solid matter is facilitated. Further, the urethane sponge is excellent in water absorption property, water discharge property, and water resistance property, and hardly deteriorated even under an acid environment, an alkaline environment, and a high temperature environment, thus it becomes unnecessary to periodically replenish the bacteria bed.

The wastewater treatment device of the present invention is characterized by further comprising a solid-liquid separation tank for separating wastewater into solid matter and a liquid.

According to this aspect, a substance contained in the wastewater that blocks the activity of the aerobic microorganisms, such as a salt, is separated and prevented from being sent to the decomposition tank.

The wastewater treatment device of the present invention is characterized by further comprising a microbubble generator or a fine bubble diffusion device.

According to this aspect, as compared to a conventional coarse air bubbling, an amount of oxygen dissolved in a liquid can be increased. As a result, during a process of absorbing/discharging a liquid having a high concentration of oxygen in/out of a carrier, a larger amount of oxygen can be supplied to the aerobic microorganisms carried in the carrier, thus the activity of the aerobic microorganisms can be further activated.

The wastewater treatment device of the present invention is characterized by comprising a solid-liquid separation device for separating wastewater containing sludge into solid matter and a liquid component, a solid treatment part in which the separated solid matter is stirred by a stirring means, and a microbubble generator for adding microbubbles, by a microbubble generation means, to a liquid produced by a decomposition treatment in the solid treatment part and led into the microbubble generator, wherein the liquid component in which the microbubbles are contained in the microbubble generator can be thrown into the solid treatment part to perform a stirring treatment.

According to this aspect, the solid matter separated from the wastewater containing sludge by the solid-liquid separation device is aerobically decomposed by the aerobic microorganisms in the solid treatment part. Further, the liquid produced by the decomposition treatment in the solid treatment part is contained with microbubbles capable of staying in water for a long time in the microbubble generator by the microbubble generation means. The liquid is then thrown into the solid treatment part and stirred with the solid matter by the stirring means. In this manner, the liquid in which fine air bubbles stay penetrates into the solid matter, thus an air can be effectively supplied to the aerobic microorganisms existing inside of a chunk of the solid matter and the aerobic microorganisms can be activated to exert high aerobic decomposition capability. As a result, decomposition time of the solid matter can be reduced.

The solid treatment part is characterized by comprising a container for storing the separated solid matter, wherein the container is installed in such that a center axis thereof is inclined downward toward a downstream side with respect to a horizontal axis.

According to this aspect, the solid matter, the carriers, and the liquid in which the microbubbles are sufficiently contained can be kept on, the downstream side of the container of the solid treatment part to perform the aerobic decomposition on the downstream side of the container in a concentrated manner, thereby enabling to increase the treatment capacity.

The solid treatment part is characterized by comprising a container for storing the separated solid matter and a water sprinkling pipe capable of spraying water like a shower from a plurality of discharge ports at an upper side of the container, wherein the liquid in which the microbubbles are contained in the microbubble generator is supplied into the container of the solid treatment part via the water sprinkling pipe.

According to this aspect, the microbubbles with a small bubble diameter have a slow floating-up speed, thus the microbubbles can be penetrated into a chunk of the solid matter and the carrier in the same way as the liquid. As a result, an air can be sufficiently supplied to the aerobic microorganisms inside of the chunk of the solid matter and the carrier, and the aerobic decomposition can be effectively performed.

The wastewater treatment method of the present invention is characterized by comprising a step of throwing into a decomposition tank a carrier carrying at least a part of an enzyme activating the activity of microorganisms in pores formed inside of a synthetic resin, a step of throwing microorganisms into the decomposition tank for decomposing solid matter obtained by crushing food waste, a step of throwing nutrients serving as a feed of the microorganisms, a step of adjusting pH inside of the decomposition tank, and s step of stirring the thrown objects in the decomposition tank while maintaining proper water supply and proper temperature.

According to this aspect, the carrier is constituted of a synthetic resin, thus decomposition by the microorganisms does not occur, and it becomes possible to stably ensure the bacteria bed, and eventually a plurality of the pores carrying the microorganisms. As a result, the aerobic microorganisms not only survive in the pores over an extended time, but also are sufficiently propagated inside thereof, thereby eliminating foul odors. Further, since the aerobic microorganisms are carried inside of the pores, the aerobic microorganisms are prevented from leaking out by an impact or water invasion caused by stirring.

The bacteria bed of the present invention is a bacteria bed used for decomposing food waste, wastewater, or the like, characterized by comprising a carrier made of a synthetic resin having, on a surface part thereof, a plurality of pores and a strong shape restoring force, the carrier carrying microorganisms and a prescribed amount of an enzyme activating the activity of the microorganisms in the plurality of the pores.

According to this aspect, by the activity of the enzyme carried in the pores of the bacteria bed, it becomes possible not only to increase a propagation rate of the aerobic microorganisms but also to sufficiently propagate the aerobic microorganisms. Further, when a stirring treatment is applied to the bacteria bed, a surface part of the bacteria bed undergoes deformation of compression and restoration repeatedly by collision and contact between the bacteria beds. Thus, absorption/discharge of water and air in/out of the pores of the bacteria bed are facilitated. As a result, it becomes possible to sufficiently supply the water and the air required for propagation of the aerobic microorganisms into the pores of the bacteria bed.

DESCRIPTION OF EMBODIMENTS

Hereinafter, embodiments of the wastewater treatment device according to the present invention will be described.
{First Embodiment}

Figure 1:
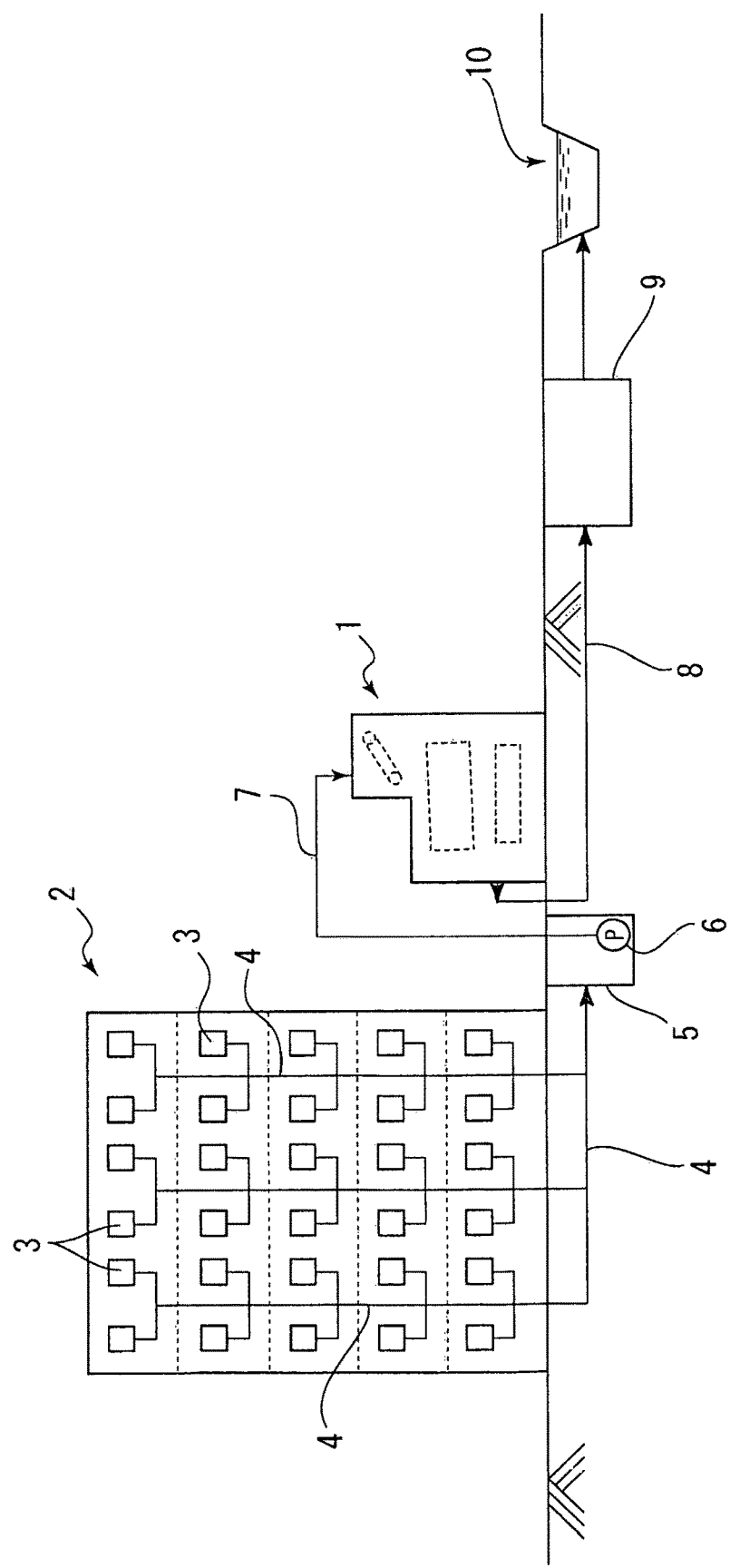
FIG. 1 is a longitudinal sectional side view showing an installation example of a wastewater treatment device according to a first embodiment.
Figure 2:
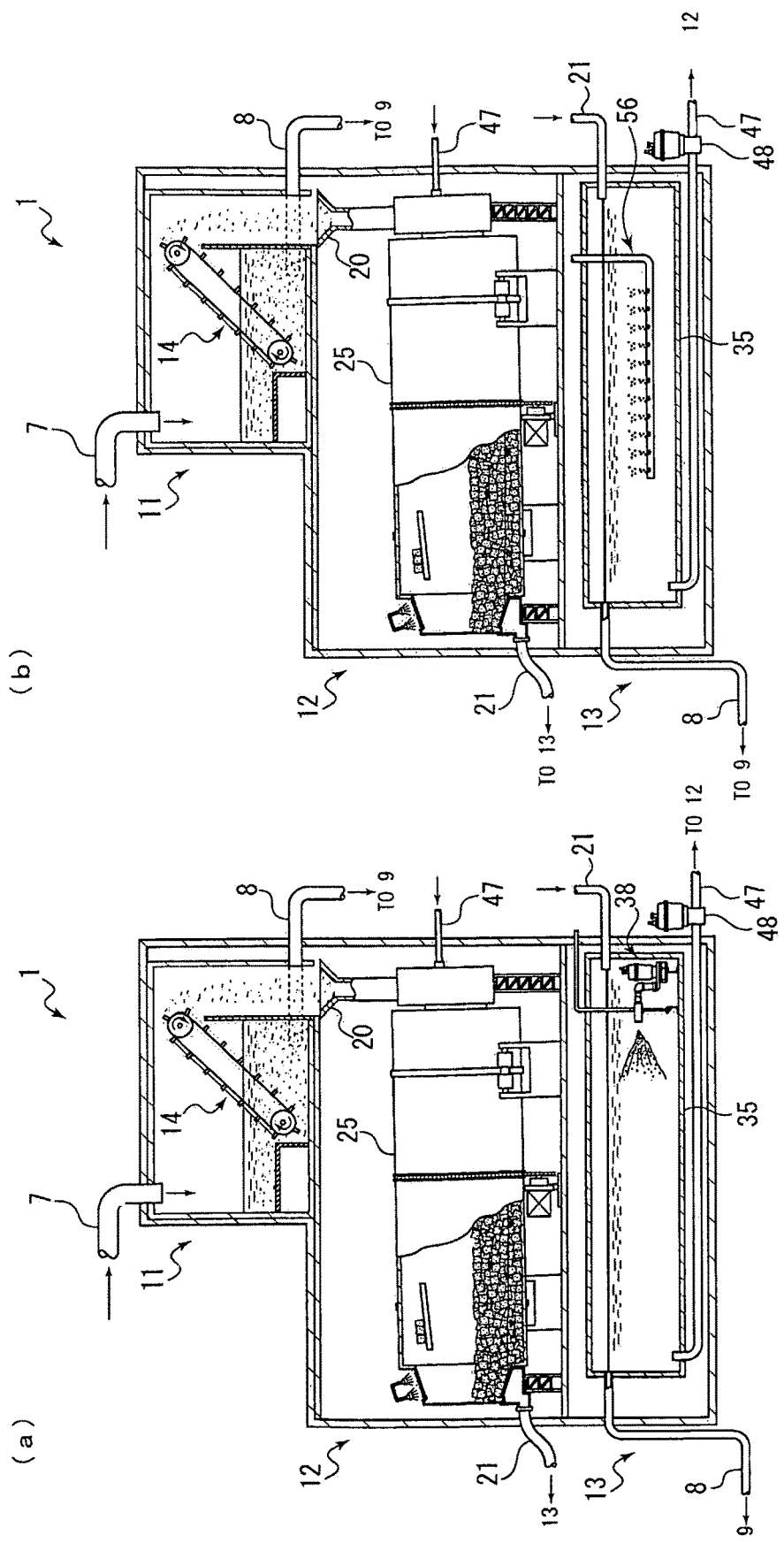
FIG. 2 is a longitudinal sectional side view showing the wastewater treatment device according to the first embodiment.

The wastewater treatment device according to a first embodiment will be described with reference to FIG. 1 to FIG. 7. Hereinafter, the following will be described under the premise that a left side of FIG. 1 and FIG. 2 is a front side (a forward side) of the wastewater treatment device. Reference numeral 1 in FIG. 1 represents the wastewater treatment device of the embodiment. This wastewater treatment device is installed in a collective housing 2 and the like, represented mainly by a mansion, and performs a purification treatment of wastewater containing food waste and the like discarded from each household before the wastewater is flown in a sewerage pipe.

As shown in FIG. 1, the wastewater treatment device 1 is connected to disposers 3, 3, . . . installed in a kitchen and the like in each household via a collection pipe 4. Although not described here in detail, the each disposer 3 is mainly installed at a lower side of a drain port of a kitchen sink in each household and collects food waste produced at the time of cooking and discarding. The disposer 3 then crushes the food waste by means of a hammer and a blade installed inside thereof and flushes the crushed objects to the wastewater treatment device 1 together with wastewater produced during cooking.

The wastewater treatment device 1 is, at an upstream side, connected via an introduction pipe 7 to a storage tank 5 that temporally stores all the wastewater containing sludge, such as food waste, introduced from the each disposer 3, 3, . . . , so that the wastewater is flown from the storage tank 5 into the wastewater treatment device 1 by a pump 6.

Further, the wastewater treatment device 1 is connected to a discharge pipe 8 for discharging a treated wastewater at a downstream side. The purified wastewater is sent to a public sewage treatment plant side 9 via the discharge pipe 8 and discharged to a river 10 and the like.

Figure 3:
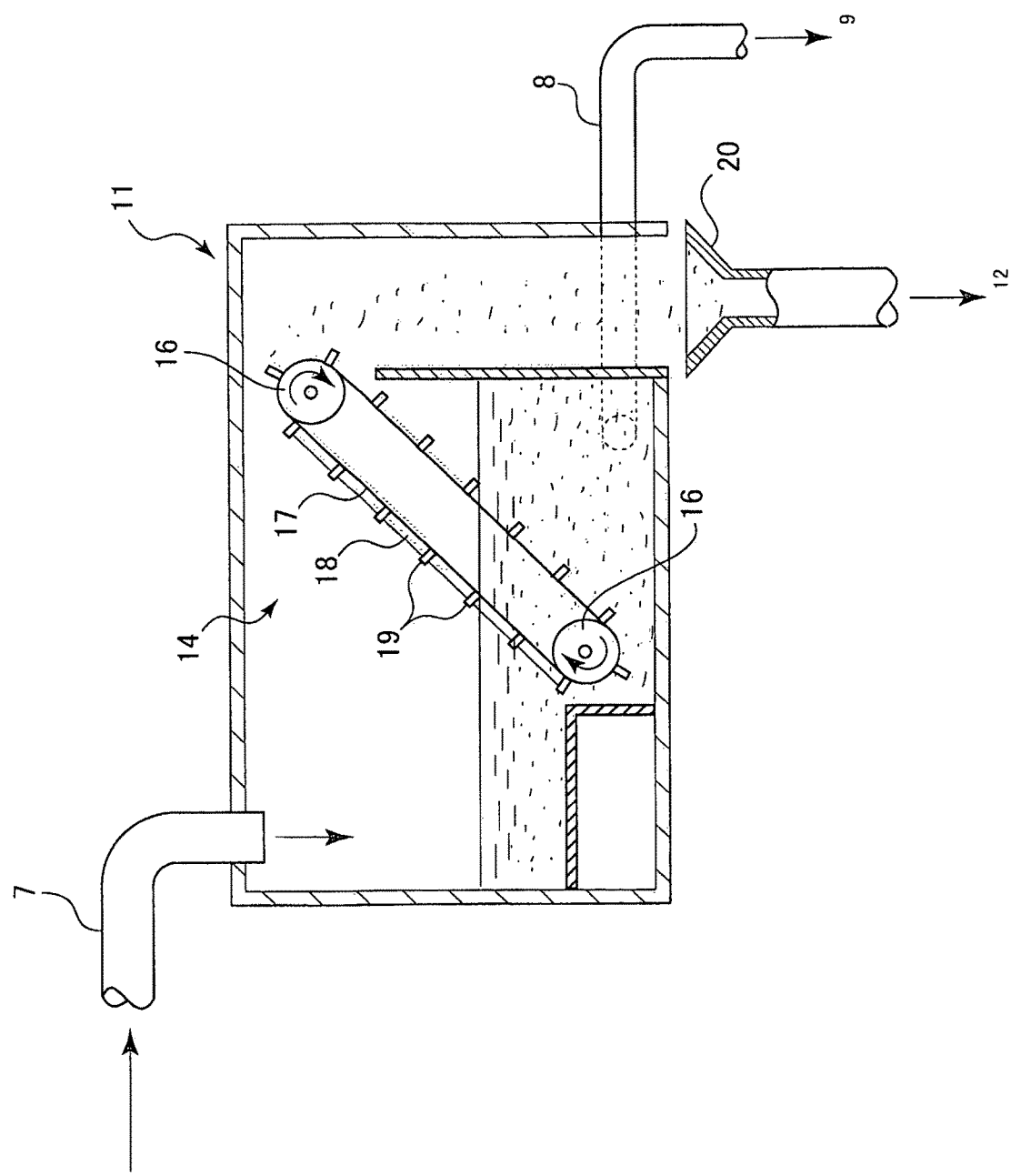
FIG. 3 is a longitudinal sectional side view showing a solid-liquid separation tank according to the first embodiment.
Figure 4:
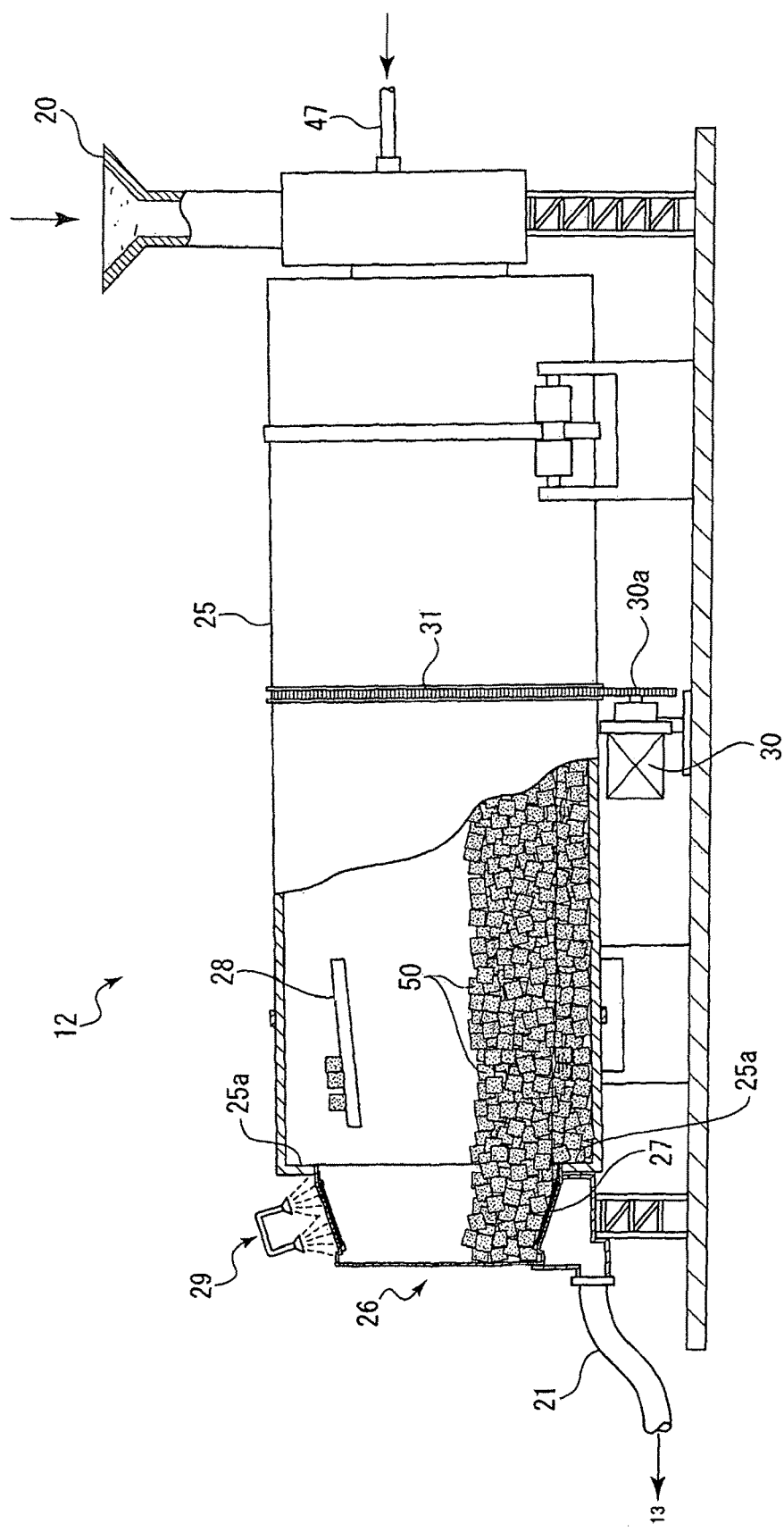
FIG. 4 is a longitudinal sectional side view showing a solid treatment part according to the first embodiment.
Figure 5:
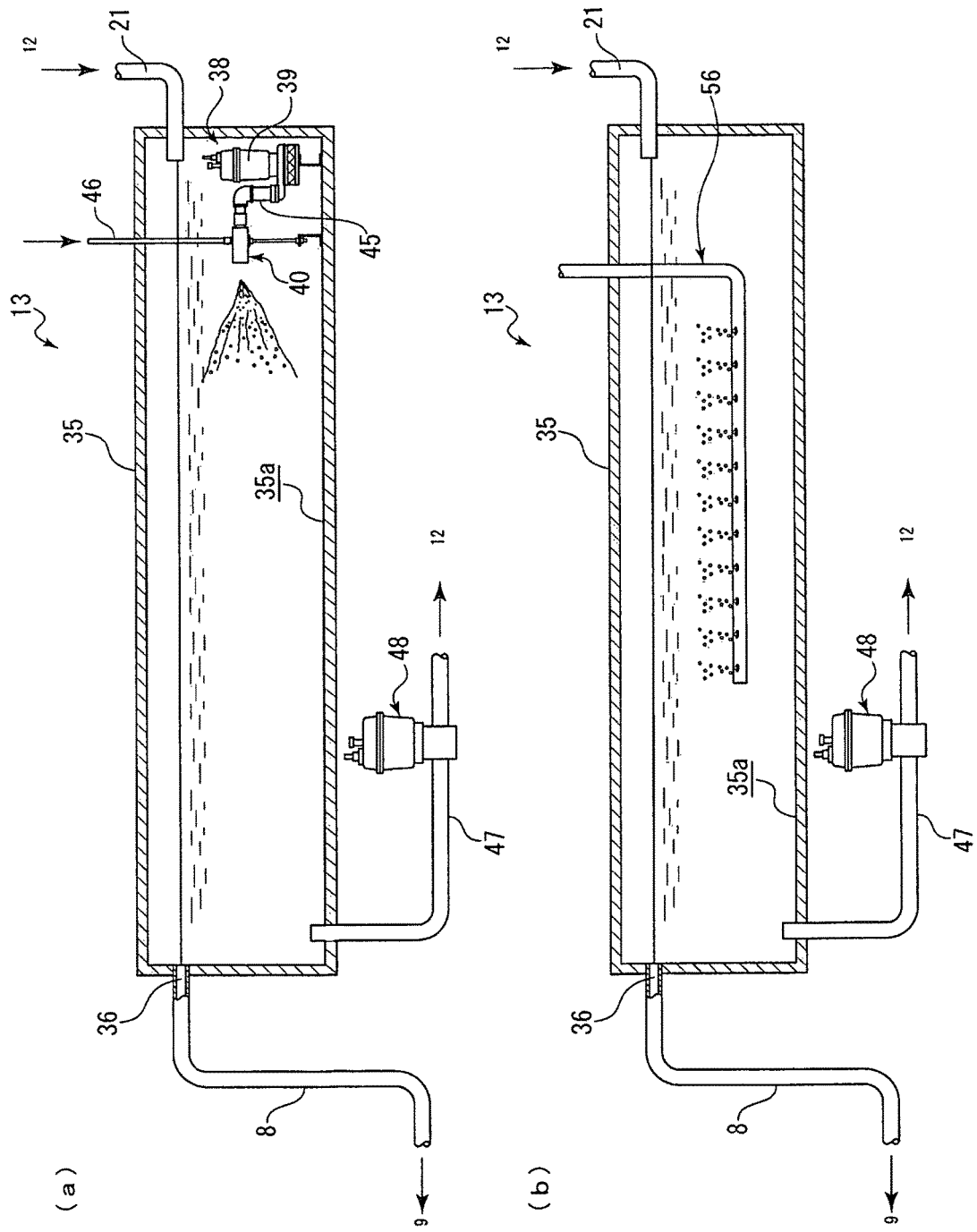
FIG. 5 is a longitudinal sectional side view showing a bubble generator according to the first embodiment.

As shown in FIG. 2, the wastewater treatment device 1 comprises a solid-liquid separation tank 11, a solid treatment part 12 for storing and purifying the separated solid matter, and a microbubble generating device 38 or a fine bubble diffusion device 56, as described below. FIG. 3 to FIG. 5 respectively show the solid-liquid separation tank 11, the solid treatment part 12, and the microbubble generator 13 and the fine bubble diffusion device 56.

As shown in FIG. 2 and FIG. 3, the solid-liquid separation tank 11 is a part for separating wastewater introduced from the storage tank 5 via the introduction pipe 7 into solid matter and a liquid, and a solid-liquid separation device 14 of an endless rotation type is installed slantly inside of the solid-liquid separation tank 11.

As shown in FIG. 3, the solid-liquid separation device 14 comprises a conveyor belt 17 wound around a pair of rollers 16, 16 rotatably supported by an upper and a lower parts of a conveyor frame 15, and a comb-form sieve plate 18 fixed to the conveyor frame 15 so as to cover an upper surface of the conveyor belt 17, the comb-form sieve plate 18 including a plenty of round rods or square rods arranged longitudinally at a minute interval in a width direction. On the surface of the conveyor belt 17, a plenty of carrying projections 19, 19, . . . are projected upward at a regular interval, the carrying projections 19 being slidably fitted between the each rod of the comb-form sieve plate 18.

The solid matter collected from the solid-liquid separation tank 11 by the comb-form sieve plate 18 is scooped out by the carrying projections 19, 19, . . . , which are sequentially rotating upward, dropped from an upper end of the comb-form sieve plate 18, and flown into the solid treatment part 12 via a collection port 20 described below. On the other hand; as shown in FIG. 3, a liquid of the wastewater having passed through the comb-form sieve plate 18 and undergone solid-liquid separation is sent from the inside of the solid-liquid separation tank 11 to the public sewage treatment plant side 9 via the discharge pipe 8. Since the liquid separated in the solid-liquid separation tank 11 contains a lot of substances that inhibit the activity of the aerobic microorganisms, such as a salt, it is sent to the public sewage treatment plant side 9 via the discharge pipe 8. In this manner, the substances that inhibit the activity of the aerobic microorganisms are prevented from being sent to the solid treatment part 12.

As shown in FIG. 4, the solid treatment part 12 comprises a decomposition tank (hereinafter referred to as a container 25), and the container 25 includes, on an upstream side, the collection port 20 for collecting the solid matter dropped from the upper end of the comb-form sieve plate 18, and a discharge part 26 on a downstream side. Further, the container 25 is installed in such that a center axis thereof is inclined with respect to a horizontal axis so as to make a rear side (an upstream side) higher than a front side (a downstream side). Thus, a content of the container 25 naturally flows down to the downstream side.

An outer peripheral gear 31 is provided on an outer peripheral surface of a middle part of the container 25. Then, a stirring means (hereinafter referred to as a rotary driving device 30) comprising a driving gear 30a engaged with the outer peripheral gear 31 is provided in the vicinity of the container 25. By driving the rotary driving device 30 by a geared motor not illustrated, the container 25 is rotatively driven with the center axis of the container 25 as a center. It is noted that the container 25 is rotatively driven for counterclockwise, viewed from the upstream side.

A plurality of bacteria beds 50, 50, . . . in the large number are thrown into the container 25, and the bacteria beds 50, 50, . . . are used as a bacteria bed for aerobic microorganisms. The bacteria beds 50, 50, . . . are formed in an approximately cube shape and can move freely inside of the container 25. The bacteria bed 50 is formed of a synthetic resin having a plurality of pores. It is noted that not only the aerobic microorganisms, but also a neutralizing agent, a deodorant agent, and the like can be added to the bacteria beds 50, 50, . . . .

Further, although not illustrated in detail here, on an inner peripheral surface of the container 25, a plurality of stirring plates 28, 28, . . . are fixed in a spiral manner for stirring the bacteria beds 50, 50, . . . . When the container 25 is rotatively driven, the bacteria beds 50, 50, . . . are moved upward by the stirring plates 28, 28, . . . , and then dropped downward again.

As shown in FIG. 4, the container 25 is inclined in such that the downstream side is lowered, as described above, and the plurality of the stirring plates 28, 28, . . . are provided in a spiral manner. Thus, a portion of the solid matter on the downstream side is lifted by the stirring plates 28, 28, . . . and dropped on the upstream side. According to this, a time for separating the solid matter in the container 25 can be extended.

On the downstream side of the container 25, a discharge part 26 for discharging an aerobically decomposed liquid to an outside of the container 25 is provided. The discharge part 26 is formed in an approximately cylindrical shape so as to be gradually contracted as it extends rearward. Further, the discharge part 26 is installed integrally with the container 25 and rotatively driven in conjunction with a rotation of the container 25.

An outer peripheral surface of the discharge part 26 is made by a punching metal part in which a plenty of small holes not illustrated are formed, and the aerobically decomposed liquid inside of the container 25 is flown out from the small holes of the punching metal part. On an inner peripheral surface of the punching metal part, a separation filter 27 is laid. The small holes of the punching metal part are occluded by the separation filter 27, thereby preventing flow-out of the solid matter before decomposition and allowing only the treated liquid to flow from the discharge part 26 to a connection pipe 21.

It is noted that a maximum diameter of the discharge part 26 is formed smaller than a diameter of the container 25, and a lower part of a downstream side end surface 25*a* of the container 25 forms a barrier wall, thereby serving as a partition plate for storing the liquid in the wastewater containing sludge. The liquid of the wastewater overflowing from the downstream side end surface 25*a* is flown into the discharge part 26, thus a water level in the container 25 is always adjusted to a level where a part of the separation filter 27 is immersed.

Further, the liquid of the wastewater is stored in such that a water level of the liquid is kept low at a lower side of the inner peripheral surface of the container 25. Thus, a majority of the bacteria beds 50, 50, . . . are positioned higher than the water level of the wastewater and easily contact with an air.

At an upper position of the discharge part 26, a shower nozzle 29 for supplying cleaning water to the separation filter 27 from a downstream side is provided. The shower nozzle 29 is configured so as to be able to jet high-pressure cleaning water toward the punching metal part of the discharge part 26. It is noted that the shower nozzle 29 may be operated continuously or at each prescribed time.

The cleaning water jetted from the shower nozzle 29 can pass through the small holes of the punching metal part of the discharge part 26 and wash away an oil component and a fine solid component adhered to a surface of the separation filter 27 toward inside of the container 25.

As shown in FIG. 5, the microbubble generator 13 or the fine bubble diffusion device 56 comprises a treatment tank 35 capable of storing a prescribed amount of liquid. The liquid exceeding the prescribed amount is discharged from a discharge port 36 on a downstream side and sent to the public sewage treatment plant side 9 via the discharge pipe 8. Hereinafter, embodiments using the microbubble generator 13 in FIG. 2 (*a*) and FIG. 5(*a*) will be mainly described, however the fine bubble diffusion device 56 in FIG. 2 (*b*) and FIG. 5 (*b*) may be also used when a super fine bubble such as a microbubble is not necessary.

A prescribed amount of a liquid such as tap water is stored beforehand in the treatment tank 35 and the microbubble generating device 38 is installed on the upstream side of the treatment tank 35. The microbubble generating device 38 is installed on a bottom surface 35*a* of the treatment tank 35 and is mainly constituted of a water suction pump 39 (a water-suctioning means) for suctioning a liquid and a microbubble generating nozzle 40. The water suction pump 39 is configured to suction an internal liquid from a water suction part 39*a* arranged in a lower part of the pump.

The microbubble generating nozzle 40 is mounted to a tip of a connection pipe 45 extended from the water suction pump 39. The liquid suctioned by the water suction pump 39 is supplied to the microbubble generating nozzle 40 and blown out.

Figure 6:
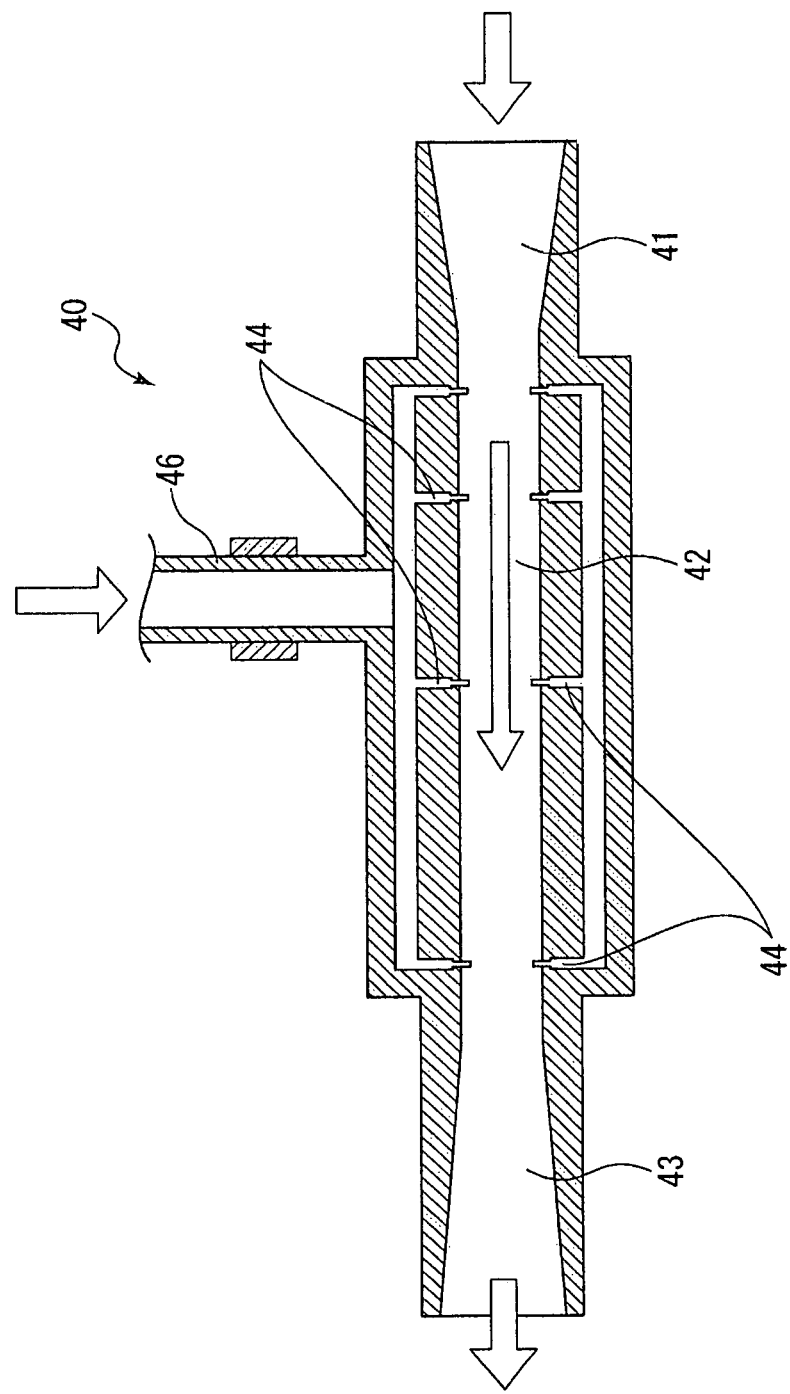
FIG. 6 is a longitudinal sectional side view showing a microbubble generating nozzle according to the first embodiment.

The microbubble generating nozzle 40 belongs to a shearing type that automatically suctions an air. Any model thereof may be used, provided that solid matter flowed in does not cause clogging. One exemplary microbubble generating nozzle 40 is, as shown in FIG. 6, a nozzle member formed in an approximately cylindrical shape (a straight pipe shape) that comprises a supply part 41 connected to the connection pipe 45 the water suction pump 39 for supplying a liquid, a compression part 42 (a passing part) for passing and compressing the liquid supplied from the supply part 41, and a blowing part for blowing out the liquid having passed through the compression part 42.

An inner diameter of the supply part 41 serving as an inlet of the liquid is narrowed toward the compression part 42 and an inner diameter of the blowing part 43 is expanded apart from the compression part 42. That is, the compression part 42 has a minimum inner diameter, thus the liquid supplied from the supply part 41 is compressed when passing through the compression part 42. As a result, a flow rate of the wastewater is increased to a high speed by a Venturi effect and the wastewater is blown out from the blowing part 43.

An air suctioned from a suction pipe 46 is configured to pass through branch pipes 44 that are branched in a plurality of parts and jetted into the compression part 42. A bubble jetted from the branch pipes 44 into the compression part 42 becomes a super fine bubble (microbubble) and is mixed with the liquid in the compression part 42. The super fine bubble is then jetted into the treatment tank 35 from the blowing part 43.

It is noted that the microbubble generating nozzle 40 is submerged under a water surface of a liquid in the treatment tank 35 and blows out a liquid containing the microbubbles into water.

Next, a treatment procedure of wastewater by the treatment device 1 of the above embodiment will be described using FIG. 2 to FIG. 5. First, wastewater flown into the solid-liquid separation tank 11 from the storage tank 5 via the introduction pipe 7 by the pump 6 is subjected to solid-liquid separation in the solid-liquid separation device 14 of the solid-liquid separation tank 11, and separated solid matter is flown into the container 25 of the solid treatment part 12 via the collection port 20.

The solid matter is subsequently stirred and mixed with the bacteria beds 50, 50, . . . carrying the aerobic microorganisms by the stirring plates 28, 28, . . . in the container 25. During this process, by a water supply means comprising a supply pipe 47 and a pump 48 installed on a downstream side of the microbubble generator 13, a prescribed amount of a liquid in which the microbubbles are contained in the treatment tank 35 is thrown into the container 25.

According to this, a bubble with a diameter of 50□m or less generated in the microbubble generating device 38 has a bubble diameter that allows the longest stay time in water, thus the liquid stored in the treatment tank 35 contains the microbubbles and simultaneously dissolves a plenty of oxygen. As a result, a sufficient amount of oxygen is continuously supplied to the solid matter and the bacteria beds 50, 50, . . . in the container 25.

It is noted that, since the liquid supplied into the container 25 of the solid treatment part 12 needs to contain a sufficient amount of the microbubbles, the supply pipe 47 is preferably installed on a downstream side of the treatment tank 35 as described above.

Further, the container 25 is installed in such that a center axis thereof is inclined with respect to a horizontal axis so as to make a rear side higher than a front side. Thus, the liquid containing the microbubbles supplied into the container 25 is allowed to naturally flow from an upstream side to a downstream side. As a result, it is possible to spread the liquid containing the microbubble thoroughly over the solid matter and the bacteria beds 50, 50, . . . flowing from the upstream side to the downstream side of the container 25.

Specifically, the microbubble generating device 38 can generate a bubble having a diameter of 50□m or less, thus more oxygen can be dissolved in the liquid as compared to a conventional bubbling. As a result, a sufficient amount of oxygen is continuously supplied to the solid matter and the bacteria beds 50, 50, . . . in the container 25. Since the liquid penetrates into the solid matter and the bacteria beds 50, 50, . . . in a state of holding the bubbles, it is possible to effectively supply an air to the aerobic microorganisms existing inside of a chunk of the solid matter and the bacteria beds 50, 50, . . . , where an air hardly reaches only by stirring the solid matter and the bacteria beds with the stirring plates 28, 28, . . . and bringing them into contact with the air. Thus, the aerobic microorganisms can be activated to exert high aerobic decomposition capability. The solid matter subjected to the aerobic decomposition is almost completely decomposed and eventually becomes substantially water, which is mixed with the supplied liquid containing the microbubbles. Then, an upper portion of the mixed liquid having a water level higher than the downstream side end surface 25a is flown into the connection pipe 21 via the separation filter 27.

Then, the aerobically decomposed liquid flown into the connection pipe 21 is thrown into the microbubble generator 13 via the connection pipe 21. The aerobically decomposed liquid contains aerobic microorganisms, bacteria and the like propagated in the container 25 of the solid treatment part 12, thus by adding the microbubbles again to the aerobically decomposed liquid by the microbubble generating device 38 and returning this liquid into the container 25 via the supply pipe 47, the aerobic decomposition capability in the solid treatment part 12 can be maintained at a high level.

As described above, in the wastewater treatment device 1 of the present embodiment, the solid matter separated from the wastewater containing sludge by the solid-liquid separation device 14 is subjected to the aerobic decomposition in the container 25, of the solid treatment part 12, which comprises the bacteria beds 50 carrying the aerobic microorganisms. During this process, the liquid in which the microbubbles are sufficiently contained in the microbubble generator 13 is thrown into the solid treatment part 12. Thus, by stirring the liquid sufficiently containing the microbubbles and the solid matter by the stirring means, the microbubbles, formed as a super fine bubble, can be sufficiently supplied to the aerobic microorganisms in the solid treatment part 12 without being obstructed by the solid matter. As a result, a decomposition treatment can be effectively performed.

Further, the container 25 is installed in such that a center axis thereof is inclined so as to make a rear side higher than a front side. Thus, the solid matter, the bacteria beds 50, 50, . . . , and the liquid containing the microbubbles are shifted toward the downstream side of the container 25 for stirring. As a result, the decomposition of the solid matter can be performed with a small amount of water.

Further, the bubble having a diameter of 50□m or less generated in the microbubble generating device 38 is slower in a flowing-up speed to a water surface and stays in water for a longer time as compared to a conventional bubble. Thus, an air can be effectively supplied also to an inside and a downside of the solid matter and the bacteria beds 50, 50, . . . , shifted toward the downstream side of the container 25.

Further, an outside air is mixed into a liquid as a super fine bubble by the microbubble generating device 38, thus the air can stay in the wastewater for a long time. By keeping the air (dissolved oxygen), mixed by the microbubble generator 13, in the wastewater, an inside of the discharge pipe 8 connecting to the public sewage treatment plant 9 can be kept in an aerobic state. As a result, an effect of reducing a cleaning frequency of the inside of the discharge pipe 8 can be expected.

Further, the microbubble can absorb dirt into a surface thereof and remove the dirt, thus a clogging problem of the separation filter 27 provided at the discharge part 26 of the solid treatment part 12 can be eliminated. As a result, a maintenance frequency can be substantially reduced. For this reason, it is not necessary to install the previously mentioned shower nozzle 29. It is noted that, when the shower nozzle 29 is installed, the fine bubble diffusion device 56 may be also used instead of the microbubble generating device 38.

Below, the bacteria bed 50 will be described with reference to FIG. 7.

Here, the bacteria bed 50 refers to a carrier 51 in which aerobic microorganisms are inoculated, while the carrier 51 refers to the one in which aerobic microorganisms are not inoculated.

Further, a synthetic resin constituting the carrier 51 by using a raw material excludes a natural resin, such as a resin derived from plants, and refers to a resin that is not decomposed by aerobic microorganisms.

Below, the bacteria bed 50 and the carrier 51 will be described with reference to FIG. 7.

As a conventional bacteria bed, chaff and the like are used, thus the bacteria bed is decomposed by aerobic microorganisms, and the chaff needs to be periodically replenished. Further, the chaff constituting the bacteria bed not only serves as a nest for microorganisms, but also plays a role of supplying an air to aerobic microorganisms by facilitating an air flow in a space between the chaff. However, as decomposition and the like of the chaff itself proceed by the aerobic microorganisms, a space between the chaff becomes smaller and air permeability in the wastewater treatment tank becomes poor. As a result, it becomes unable to supply sufficient air to the aerobic microorganisms and propagation of the aerobic microorganisms is reduced, thereby causing a problem of producing foul odors.

Thus, the bacteria bed 50 is constituted of the carrier 51 made of a synthetic resin having a plurality of pores 52 as a raw material, which carries aerobic microorganisms and a prescribed amount of an enzyme activating the activity of the aerobic microorganisms in at least a part of the plurality of the pores formed in the carrier 51.

Figure 7:
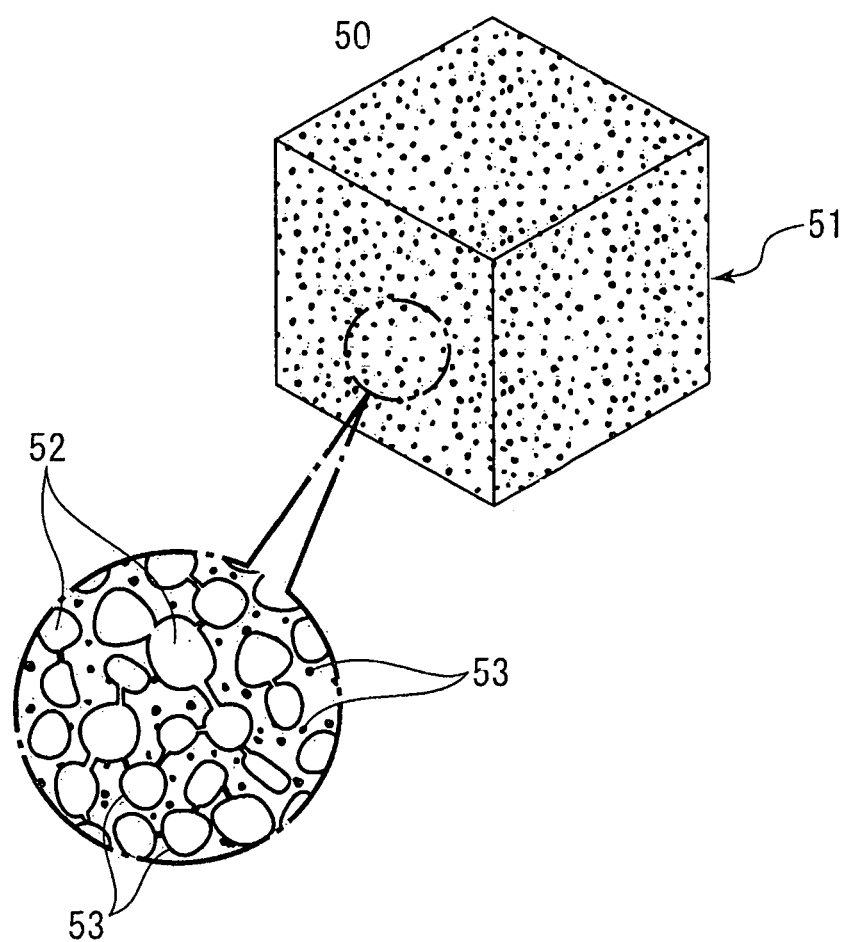
FIG. 7 is a diagram illustrating structures of a bacteria bed and a carrier.

FIG. 7 shows structures of the bacteria bed 50 and the carrier 51. The pores 52 are formed on the carrier 51 made of a synthetic resin. The pores 52 include the one at least a part of which is communicated with another pore and the one not communicated with another pore. A size of the pores 52 is about 50 µm to about 800 µm and the pores 52 having various sizes are nearly uniformly dispersed in the carrier 51. Further, the pores 52 carry an enzyme 53 and serve as a nest for aerobic microorganisms (not illustrated). The pores 52 having a larger size are never be filled with enzymes, and wastewater and an air enter and exit the pores 52 by a stirring action as described below. Thus the pores 52 having a larger size provide a suitable environment for propagating the aerobic microorganisms. On the other hand, the pores 52 having a smaller size are filled with the enzymes, and the wastewater and the air hardly enter and exit the pores 52. However the pores 52 having a smaller size function as a supply source of the enzymes for a long period of time by gradually releasing the enzymes.

Since the pores 52 carry the enzymes activating the activity of the aerobic microorganisms, propagation of the aerobic microorganisms can be facilitated by the action of the enzymes.

To prevent the propagation of the aerobic microorganisms from being affected by changes in an installation environment and an operation condition of the wastewater treatment device, as the enzymes carried on the carrier, a plurality of kinds of enzymes are used, thereby allowing the aerobic microorganisms to propagate.

As described above, the bacteria bed 50 is made of a synthetic resin, thus decomposition by the microorganisms does not occur, thereby making it possible to stably ensure the carrier 51, and eventually the plurality of the pores carrying the microorganisms. Further, by the action of the enzymes carried inside of the pores of the carrier, not only a propagation rate of the aerobic microorganisms can be increased, but also the aerobic microorganisms can be sufficiently propagated, thus enabling to prevent production of foul odors. Further, since the aerobic microorganisms are carried inside of the pores, the aerobic microorganisms are prevented from leaking out by an impact or water invasion caused by stirring.

Below, a synthetic resin constituting the carrier 51 will be described.

At least a surface part of the carrier 51 is constituted of an elastic body having a strong shape restoring force. By constituting at least a surface part of the carrier by an elastic body having a strong shape restoring force, in a stirring process where the solid matter and the bacteria bed are stirred in the treatment tank, at least a surface part of the bacteria bed undergoes deformation of compression and restoration repeatedly by collision and contact between the bacteria beds to facilitate absorption/discharge of water and air in/out of the pores of the bacteria bed. As a result, it becomes possible to sufficiently supply the water and the air required for propagation of the aerobic microorganisms into the pores of the bacteria bed.

Further, in the wastewater treatment device, the bacteria bed 50 is exposed to water and simultaneously temperature thereof may reach near 60° C. by the activity of the aerobic microorganisms. Further, the activity of the aerobic microorganisms is usually increased in a neutral or a weakly acidic, or an alkaline environment. However, during a decomposition process of food waste, it sometimes happens that pH is decreased according to a condition and the activity of the aerobic microorganisms is inhibited by the low pH. To prevent such a situation, the pH is sometimes adjusted by throwing an appropriate amount of organic lime, slaked lime, calcium carbonate, and the like into the container 25. As a result, the pH in the wastewater treatment device may significantly change.

For this reason, a urethane sponge is used as a material for constituting the carrier 51. Since the urethane sponge is excellent in water absorption property, water discharge property, and water resistance property, and hardly deteriorated even under an acid environment, an alkaline environment, and a high temperature environment, thus it is not necessary to periodically replenish the bacteria bed.

Further, the urethane sponge constituting the carrier is characterized by being produced with a density that can be freely changed to a certain degree. Thus, when the urethane sponge is produced in such a manner that the urethane sponge has, after absorbing the wastewater, almost equal specific gravities to that of the solid matter obtained by crushing food waste, the bacteria bed and the solid matter sufficiently contact with each other instead of separating from each other during stirring, and the decomposition of the solid matter is facilitated. It is noted that the urethane sponge represents one example and any material having equivalent characteristics to the urethane sponge may be used.

Below, a stirring action in the container 25 of FIG. 3 will be described.

When the container 25 is stirred once per one to several minutes by rotatively driving, the bacteria beds 50, 50, . . . are moved upward by the stirring plates 28, 28, . . . so that the bacteria beds 50 submerged in the wastewater are thrown onto another bacteria beds that are not submerged in the wastewater. As a result, the bacteria beds are subjected to deformation of compression and restoration by collision and contact between the bacteria beds. By repeating such a stirring action, absorption/discharge of water and air in/out of the pores of the bacteria beds are facilitated and it becomes possible to sufficiently supply the water and the air required for propagation of the aerobic microorganisms into the pores of the bacteria beds.

As described above, the stirring action and the action of the enzymes carried in the air pores together activate the activity of the aerobic microorganisms carried in the bacteria beds 50. As a result, the solid matter contained in the wastewater inside of the decomposition tank 11 is decomposed and the wastewater is purified.

Figure 8:
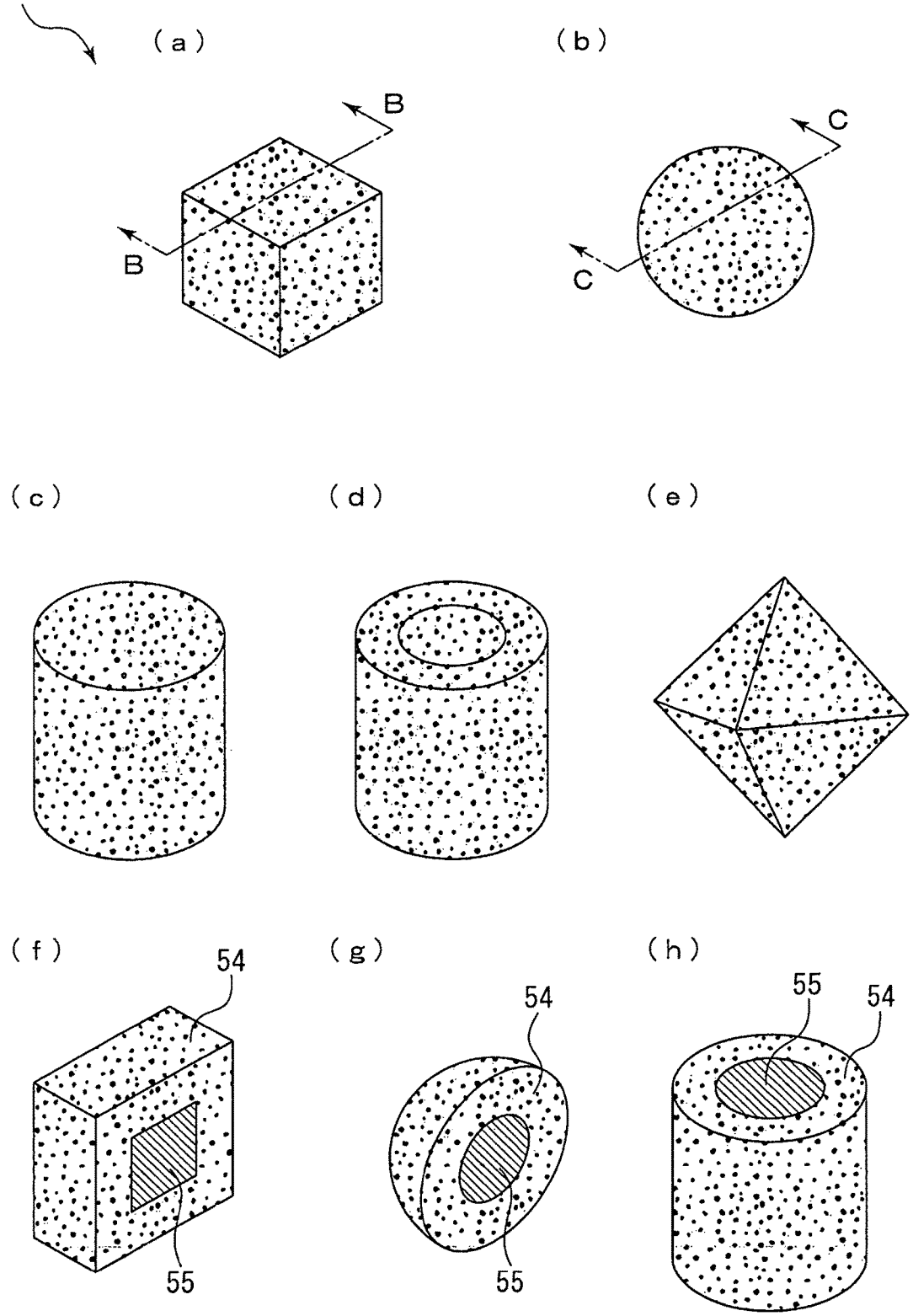
FIG. 8 is a diagram illustrating carriers according to another embodiments.

A structure of the carrier 51 will be described with reference to FIG. 8. The carrier may be formed not only in an approximately cube shape as shown in FIG. 8(a), but also in an approximately spherical shape, an approximately columnar shape, a tubular shape, and an approximately regular octahedron shape as shown in FIG. 8(b) to FIG. 8(e). In addition, by mixing the carriers 51 having different shapes for use, a large space can be kept between the carriers, and air permeability in the wastewater treatment tank can be also further improved. The carrier 51 is configured to have one side length of about 1 cm to about 10 cm, however the length can be determined taking a capacity of a food waste treatment machine and an amount of food waste to be treated into account.

Further, from FIG. 8(a) to FIG. 8(e), the carrier is constituted of a synthetic resin using a single and identical mineral, however, at least a surface part of the carrier may be constituted of an elastic body having a strong shape restoring force and other parts may be constituted of a different material. FIG. 8(f) shows a B-B cross section of FIG. 8(a), while FIG. 8(g) shows a C-C cross section of FIG. 8(b). For example, as shown in FIG. 8(f), a surface part 54 of the cube is constituted of an elastic body having a strong shape restoring force and a core part 55 is constituted of a synthetic resin having different specific gravities from that of the surface part 54. In this manner, the average specific gravities of the carrier can be adjusted to fit to those of the wastewater or the solid matter. Further, the core part 55 is constituted of a carrier abundantly containing enzymes and the surface part 54 is covered with an elastic body having a strong shape restoring force. In this manner, oxygen can be supplied to aerobic microorganisms over an extended time. Further, as shown in FIG. 8(h), the carrier is constituted in such a manner that a part of the core part 55 is exposed.

In the wastewater treatment device 1 of the first embodiment (FIG. 2), a liquid flown out from the container 25 is returned to the container 25 again in a state of sufficiently dissolving oxygen or containing microbubbles capable of staying in water for a long time by the microbubble generating device 38 or the fine bubble diffusion device 56, thus the liquid in which fine bubbles are held penetrates into the solid matter. As a result, an air can be effectively supplied to aerobic microorganisms existing inside of a chunk of the solid matter, the aerobic microorganisms can be activated to exert high aerobic decomposition capability, and a time required for decomposing the solid matter can be reduced. However, when aerobic decomposition is performed by throwing a bacteria bed made of chaff into the solid treatment part 12 and using a liquid having a high concentration of dissolved oxygen and sufficiently containing microbubbles, the bacteria bed made of chaff is decomposed in a short time. On the other hand, the carrier 51 is hardly decomposed even in the liquid having a high concentration of dissolved oxygen and sufficiently containing microbubbles, thus the pores 52 are never be lost. As a result, the aerobic microorganisms carried in the pores 52 can be prevented from leaking out.

Further, since a bubble generated by the microbubble generating device 38 or the fine bubble diffusion device 56 has a small diameter, an amount of oxygen dissolved in a liquid can be increased as compared to a conventional coarse air bubbling. As a result, it becomes possible not only to supply oxygen to aerobic microorganisms in the pores 52 by absorbing/discharging the liquid having a high concentration of oxygen in/out of the urethane sponge by the above-mentioned stirring action, but also to further increase a decomposition effect of the solid matter contained in the wastewater by activating the aerobic microorganisms carried in the pores 52 together with the action of the enzymes carried in the pores 52.

Further, by using the microbubble generating device 38 or the fine bubble diffusion device 56, penetration of bubbles is not blocked by sludge existing in the treatment tank, unlike a conventional wastewater treatment device in which aerobic decomposition is performed while sending a coarse bubble for aeration. Thus, an air can be thoroughly supplied to the aerobic microorganisms in the treatment tank and aerobic decomposition can be efficiently performed.

In the present application, the bacteria bed 50 is produced by inoculating aerobic microorganisms on the carrier 51, and carrier 51 itself does not contain aerobic microorganisms before inoculation. Thus, a work to inoculate aerobic microorganisms on the carrier is required as a first step. Below, a work method thereof and a wastewater treatment method will be described.

After nutrients for aerobic microorganisms, such as food waste, leftovers, dog food, or the like, are thrown into the solid-liquid separation tank 11, they are subjected to solid-liquid separation and solid matter is sent to the container 25. Further, chaff, leaf mold, lime, and the carrier 51 are thrown into the container 25, and a proper amount of water is supplied. Then the thrown objects in the container 25 are slowly rotated while temperature is held at a proper temperature. During this process, aerobic microorganisms attached to the chaff and the leaf mold are activated by the action of an enzyme carried inside of the air pores of the carrier 51 and explosively propagate to proceed with decomposition of the food waste, the leftovers, the chaff and the leaf mold. In the same time, the aerobic microorganisms propagate inside of the air pores of the carrier 51, thereby completing inoculation of the carrier 51 to prepare the bacteria bed 50.

A step of throwing the chaff and the leaf mold mentioned above into the container 25 is carried out for a purpose of throwing aerobic microorganisms that decompose food waste. Species of aerobic microorganisms are different among regions where the wastewater treatment device 1 is installed, thus, it is desirable to use local chaff and leaf mold collected in a region where the wastewater treatment device 1 is installed. It is, of course, possible to directly throw aerobic microorganisms. Further, the activity of aerobic microorganisms may be reduced at low temperatures, such as in the winter season. In this case, chaff and leaf mold may be adequately thrown into the container 25 by monitoring operation condition of the wastewater treatment device.

The above-mentioned slaked lime, calcium carbonate, and the like are used for adjusting pH. The aerobic microorganisms are usually active in a neutral or a weakly acidic, or an alkaline environment. However, during a decomposition process of food waste, it sometimes happens that the pH is decreased according to a condition and the activity of the aerobic microorganisms is inhibited by the low pH. To prevent such a situation, the pH is adjusted by throwing an appropriate amount of slaked lime, calcium carbonate, and the like into the decomposition tank 11.

As described above, the carrier 51 is constituted of a synthetic resin, thus the carrier 51 is not decomposed by microorganisms, thereby making it possible to stably ensure the bacteria bed 50, and eventually the plurality of the pores 52 carrying the microorganisms. As a result, the aerobic microorganisms not only survive in the pores 52 over an extended time, but also are sufficiently propagated inside thereof, which in turn eliminates foul odors. Further, since the aerobic microorganisms are carried inside of the pores, the aerobic microorganisms are prevented from leaking out by an impact or water invasion caused by stirring.

It is noted that the carrier 51 carries an enzyme, however an effect thereof can be still sufficiently exerted when a carrier that carries an enzyme and a carrier that does not carry an enzyme are mixed and used.

{Second Embodiment}

Figure 9:
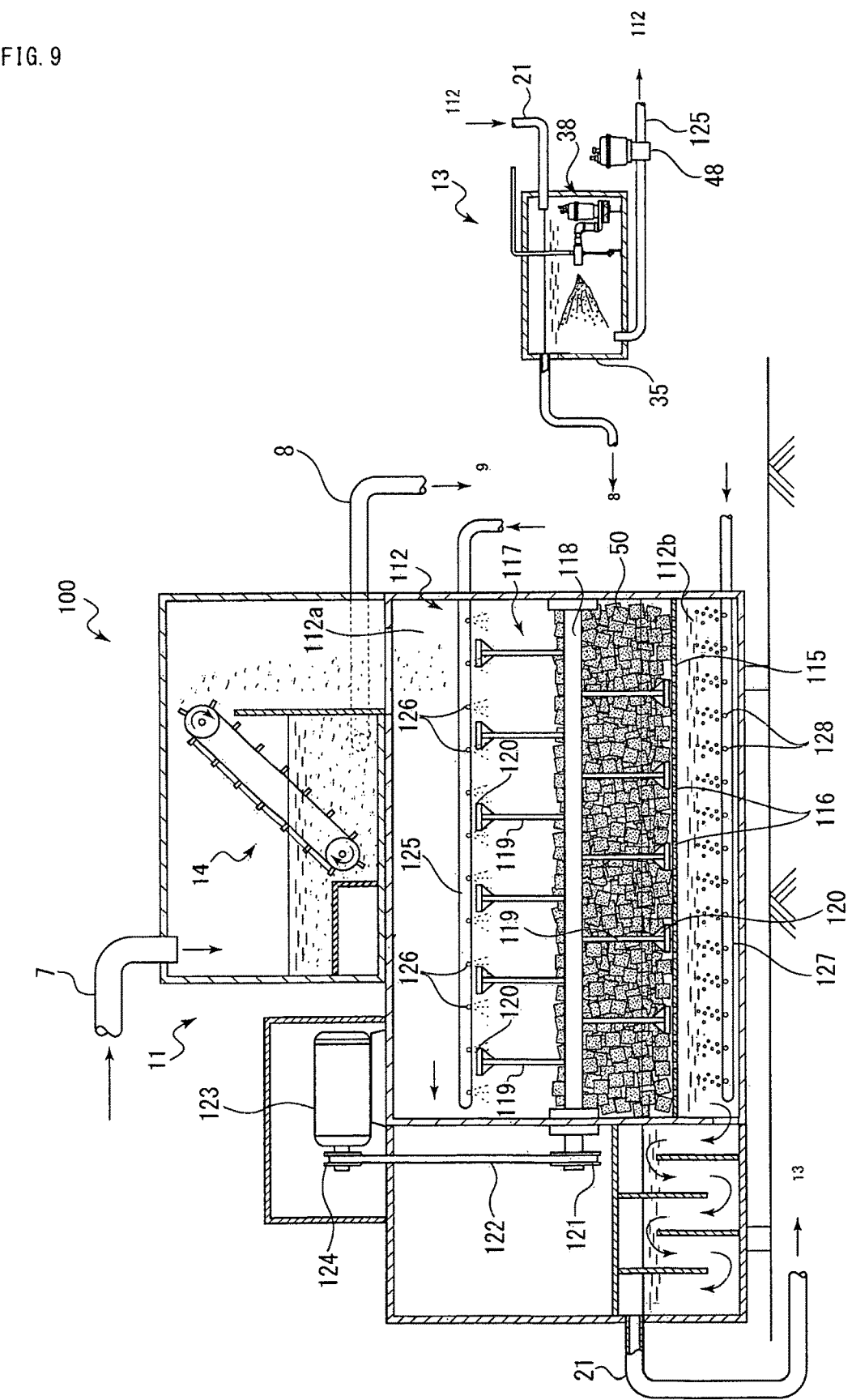
FIG. 9 is a longitudinal sectional side view showing a wastewater treatment device according to a second embodiment.
Figure 10:
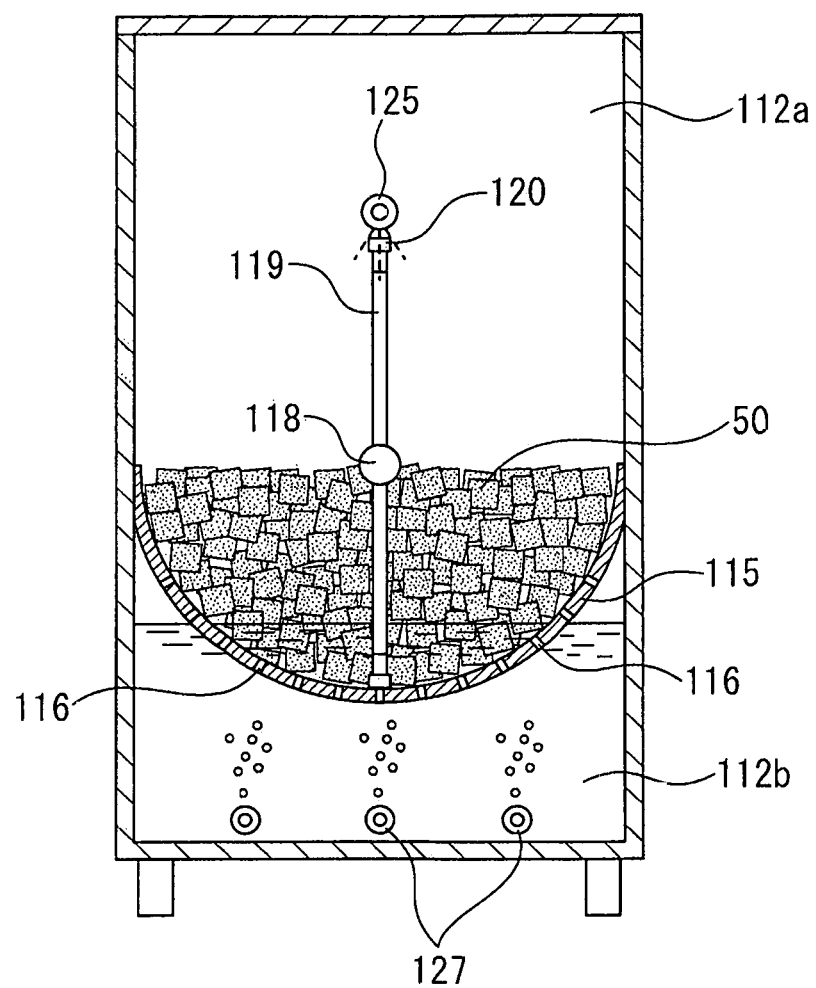
FIG. 10 is a latitudinal sectional side view showing the wastewater treatment device according to the second embodiment.

The wastewater treatment device according to a second embodiment will be described with reference to FIG. 9 and FIG. 10. It is noted that the duplicated description of the same configuration as the above embodiment will be omitted.

A wastewater treatment device 100 comprises solid-liquid separation tank 11 for separating wastewater into solid matter and a liquid, a solid treatment part 112 below the tank, and a microbubble generator 13. Below, as with the first embodiment, an embodiment using the microbubble generator 13 will be mainly described, however a fine bubble diffusion device 56 can be also used when a super fine bubble such as a microbubble is not necessary.

The solid treatment part 112 is partitioned by a bottom plate 115 into a decomposition tank 112a at an upper part and an aeration tank 112b at a lower part. The bottom plate 115 is made of a perforated plate, such as a punching plate having a plenty of air pores 116 with a small diameter, and formed in a U-shape in a front view. Further, the bacteria beds 50 of the first embodiment, as well as solid matter (not illustrated), are thrown on the bottom plate 115.

A stirring device 117 is provided at an approximately central part of inside of the solid treatment part 112. The stirring device 117 comprises a rotation shaft 118, which is supported by a housing of the solid treatment part 112 at both right and left end parts and oriented in a longitudinal direction, and a plurality of stirring rods 119, 119, . . . , which are fixed in a direction orthogonal to an axis of the rotation shaft 118. Stirring blades 120, 120, . . . are attached to each of the stirring rods 119, 119, . . . .

A pulley 121 is installed at one end of the rotation shaft 118 and wound by a belt 122. Using the belt 122, the solid matter and the bacteria beds 50 are slowly stirred with a rotation of a driving pulley 124 of a geared motor 123 placed on an upper part of the solid treatment part 112.

A plurality of air supply pipes 127 are provided in a right-and-left direction at a lower part inside of the aeration tank 112b. A compressed air is jetted out from blowholes 128 bored on an upper surface of the supply pipes 127, and air bubbles from the blowholes 128 are flown into the solid treatment part 112 through air pores 116 of the above-mentioned bottom plate 115, thereby enabling to supply an air in the solid treatment part 112.

Further, a water supply means (hereinafter, referred to as a water sprinkling pipe 125) is provided along a longitudinal direction at an upper side inside of the decomposition tank 112a. Water is jetted like a shower from a plurality of discharge ports 126 bored on the water sprinkling pipe 125.

The microbubble generator 13 comprises a treatment tank 35 capable of storing a prescribed amount of liquid and the liquid exceeding the prescribed amount is sent to a public sewage treatment plant 9 side via the discharge pipe 8.

Further, the microbubble generating device 38 or the fine bubble diffusion device 56 is installed on an upstream side of the treatment tank 35. Further, a pipe provided at a downstream side of the microbubble generator 13 corresponds to the water sprinkling pipe 125 of the solid treatment part 112. The liquid in which the microbubbles are contained in the treatment tank 35 is jetted onto the solid matter and the bacteria beds 50 in the decomposition tank 112a by the pump 48 and the water sprinkling pipe 125.

According to this, the microbubbles generated in the microbubble generating device 38 are jetted together with the liquid from an upper side onto the solid matter and the bacteria beds 50 in the decomposition tank 112a. During this process, since the microbubble has a small bubble diameter, an amount of oxygen dissolved in the liquid can be increased as compared to a conventional bubbling. Further, by the above-mentioned stirring action, a liquid having a higher concentration of oxygen is absorbed in/out of the carrier 51, thus it becomes possible not only to supply oxygen to the aerobic microorganisms in the pores 52, but also to further increase a decomposition effect of the solid matter contained in the wastewater by activating the aerobic microorganisms carried in the pores 52 in combination of the action of enzymes carried in the pores 52.

The foregoing described the embodiments of the present invention using the drawings, however it should be understood that the specific constitutions are not at all restricted to these embodiments, and changes and additions are also included in the present invention without departing from the gist of the present invention.

For example, in the embodiments, explanation has been given of a mode in which a liquid such as a tap water is stored in the treatment tank 35. However, not only limited to this, a liquid component separated in the solid-liquid separation device 14 may be stored in the treatment tank 35 and the separated liquid component may be thrown into the solid treatment part after being contained with the microbubbles. According to this, an outer air turned into microbubbles is sufficiently supplied to aerobic microorganisms existing in the treatment tank 35, thus the liquid component, solid-liquid separated from the wastewater in the solid-liquid separation tank 11 can be effectively aerobically decomposed in the purification treatment tank 35 by the activated aerobic microorganisms. As such, a purification treatment can be performed.

Further, explanation has been given of a mode in which the microbubble generating device 38 is installed in the treatment tank 35 of the microbubble generator 13, suctions a liquid such as a tap water in the treatment tank 35, and jets a liquid containing microbubbles in the treatment tank 35. However, the microbubble generator 13 may be configured not to comprise the purification treatment tank 35. For example, a configuration may be such that a treated liquid discharged from the solid treatment part 12 is directly circulated into the solid treatment part 12 via a pipe and the microbubble generating device 38 is installed onto this pipe. Further, a configuration may be such that the microbubble generating device 38 is installed in the solid-liquid separation tank 11 and a liquid component right after being solid-liquid separated in the solid-liquid separation device 14 is contained with microbubbles.

Further, not limiting to a mode in which the solid-liquid separation device, the solid treatment part, and the microbubble generator are surrounded with a housing and integrally unitized as shown in the first embodiment, each of them may be detachable and constituted as a separate device. Further, a part of the solid-liquid separation device, the solid treatment part, and the microbubble generator may be constituted by utilizing an existing device such as a storage tank.

REFERENCE SIGNS LIST

1 Wastewater treatment device
2 Collective housing
3, 3, . . . Disposers
4 Collection pipe
5 Storage tank
6 Pump
7 Introduction pipe 8 Discharge pipe
9 Public sewage treatment plant
10 River
11 Solid-liquid separation tank
12 Solid treatment part
13 Microbubble generator
14 Solid-liquid separation device
15 Conveyor frame
16, 16 Rollers
17 Conveyor belt
18 Comb-form sieve plate
19, 19, . . . Carrying projections
20 Collection port
21 Connection pipe
25 Container
25a Downstream side end surface of container
26 Discharge part
27 Separation filter
28, 28 . . . Stirring plates
29 Shower nozzle
30 Rotary driving device
30a Driving gear
31 Outer peripheral gear
35 Treatment tank
35a Bottom surface of treatment tank
36 Discharge port
38 Microbubble generating device
39 Water suction pump
39a Water suction part
40 Microbubble generating nozzle
41 Supply part
42 Compression part
43 Blowing part
44 Branch pipe
45 Connection pipe
46 Suction pipe
47 Supply pipe
48 Pump
50, 50, . . . Bacteria beds
51 Carrier
52 Pore
53 Enzyme
54 Surface part
55 Core part
56 Fine bubble diffusion device

The invention claimed is:

1. A wastewater treatment device for decomposing solid matter by using aerobic microorganism in bacteria bed, comprising:
a decomposition tank for accommodating the bacteria bed and solid matter obtained by crushing food waste;
a water supply for supplying water in the decomposition tank; and
a stirrer for stirring the solid matter, the water and the bacteria bed in the decomposition tan, wherein the bacteria bed comprises a carrier and microorganism carried by the carrier, the carrier being formed of a surface part provided with a plurality of pores having the microorganism carried therein and a core part made of a synthetic resin, the surface part and the core part being different from each other in material and in specific gravities, the carrier having average specific gravities adjusted to match those of wastewater solid matter.

2. The wastewater treatment device according to claim 1, wherein the carrier carries a prescribed amount of an enzyme in the plurality of the pores.

3. The wastewater treatment device according to claim 2, wherein the surface part of the carrier is formed of an elastic body having a strong shape restoring force.

4. The wastewater treatment device according to claim 2, wherein the surface part of the carrier is formed of a urethane sponge.

5. The wastewater treatment device according to claim 2, further comprising a solid-liquid separation tank for separating the wastewater into solid matter and a liquid.

6. The wastewater treatment device according to claim 2, further comprising a microbubble generator or a fine bubble diffusion device in the decomposition tank.

7. The wastewater treatment device according to claim 1, wherein the surface part of the carrier is formed of an elastic body having a strong shape restoring force.

8. The wastewater treatment device according to claim 7, further comprising a solid-liquid separation tank downstream of the decomposition tank for separating the wastewater into solid matter and a liquid.

9. The wastewater treatment device according to claim 7, further comprising a microbubble generator or a fine bubble diffusion device in the decomposition tank.

10. The wastewater treatment device according to claim 1, wherein the surface part of the carrier is formed of a urethane sponge.

11. The wastewater treatment device according to claim 10, further comprising a solid-liquid separation tank downstream of the decomposition tank for separating the wastewater into solid matter and a liquid.

12. The wastewater treatment device according to claim 10, further comprising a microbubble generator or a fine bubble diffusion device in the decomposition tank.

13. The wastewater treatment device according to claim 1, further comprising a solid-liquid separation tank downstream of the decomposition tank for separating the wastewater into solid matter and a liquid.

14. The wastewater treatment device according to claim 13, further comprising a microbubble generator or a fine bubble diffusion device in the decomposition tank.

15. The wastewater treatment device according to claim 1, further comprising a microbubble generator or a fine bubble diffusion device in said decomposition tank.

16. A bacteria bed for decomposing food waste or, wastewater, comprising a carrier and microorganisms carried by the carrier, the carrier being formed of a surface part provided with a plurality of pores having the microorganisms carried therein and a core part formed of a synthetic resin, the surface part and the core part being different from each other in material and in specific gravity, the carrier having average specific gravities adjusted to match those of wastewater or a solid matter obtained by crushing food waste, the carrier carrying microorganisms and a prescribed amount of an enzyme activating activity of the microorganisms in the plurality of the pores.

17. The bacteria bed according to claim 16, wherein at least the surface part of the carrier is formed of an elastic body having a strong shape restoring force.

18. The bacteria bed according to claim 17, wherein the surface part of the carrier is formed of a urethane sponge.

19. The bacteria bed according to claim 16, wherein the surface part of the carrier is formed of a urethane sponge.

* * * * *